Sept. 23, 1969     P. S. MONROE     3,468,014
ASSEMBLY METHOD
Filed March 29, 1966

INVENTOR
PAUL S. MONROE
BY

*William C. Long*
ATTORNEY

United States Patent Office 3,468,014
Patented Sept. 23, 1969

3,468,014
ASSEMBLY METHOD
Paul Seeley Monroe, Chatham, N.J., assignor to Halcon International, Inc., a corporation of Delaware
Filed Mar. 29, 1966, Ser. No. 538,336
Int. Cl. B23k 31/02
U.S. Cl. 29—472.1                    3 Claims

ABSTRACT OF THE DISCLOSURE

The present invention relates to a new method for assembling a sheet and tube apparatus by inserting sheet metal insert slugs between adjacent tubing and welding these insert slugs to each other and the tube ends.

---

The present invention is concerned with an improved method for the construction of various apparatus such as are used in the chemical process industries and is particularly concerned with an improved method for assembling sheet and tube apparatus wherein the tube sheets and tubes are of different metals. The invention is also concerned with the apparatus which results from these assembly procedures.

The chemical processing industries require various items of equipment which are of enormous size. For example, in catalytic processes involving the provision of catalyst in tubular reactors, trends in process economics dictate that these reactors be of very great size. In order to maintain reasonable economies of construction, shipping, erection, etc., it is frequently desirable to construct the tubes of a lighter and thinner metal such as stainless steel whereas the sheets are of heavy grade conventional carbon steel. Of importance in such assemblies is that there be effective joining of the tubes of the tube sheets by welding.

Where unlike metals are involved, the task of joining the metal surfaces by welding is quite complex and difficult. An alternative would be to clad the surface of the tube sheet with the same metal of which the tube is comprised but such cladding techniques are themselves costly.

It is an object of the present invention to provide an improved apparatus involving surfaces of different metals. It is a particular object of the invention to provide an improved sheet and tube apparatus assembly and assembly method.

It is a special object of the invention to provide an improved method for assembling a tubular reactor having stainless steel tubes and carbon steel tube sheets, and to provide the tubular reactor so assembled.

Other objects will be apparent from the following description of the invention.

The present invention is illustrated by four figures which accompany the instant specification. Referring to these figures, FIGURE 1 presents a plan view of a pattern of a tubular reactor with triangular pitch assembled in accordance with the present invention.

Figure 2:
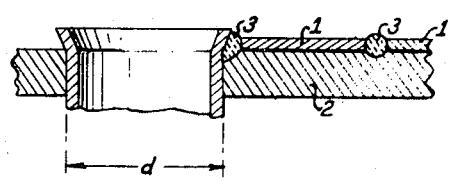
FIGURE 2 is a section view along the line A—A of FIGURE 1.

In sheet and tube apparatus, the tubes are positioned in appropriate holes in the tube sheets. The tubes are normally arranged in triangular pitch, i.e., the centers of adjacent tubes comprise the points of an equilateral triangle, or square pitch, i.e., the centers of adjacent tubes comprise the corners of a square. Other configurations are possible. The tubes are positioned such that the tube ends extend slightly past the outer sheet surface as illustrated in FIGURE 2 for example. The tube ends can be flared slightly, if desired.

In practice of the present invention, sheet metal inserts stamped in a shape approximating the shape of the sheet surface area between tubes and of the same metal as the tubes are positioned on the sheet between adjacent tubes. These inserts are welded to each other and to the tube ends which extend past the sheet surface, thus forming a tight and uniform surface.

The present invention can best be illustrated by reference to the specific practice insofar as the assembly of a sheet and tube apparatus such as tubular reactor is concerned. Also it will be obvious that the invention is applicable to other apparatus.

Figure 1:
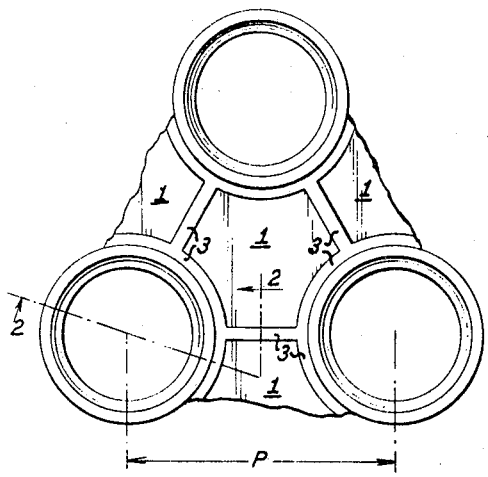

In practice of the invention as illustrated in FIGURES 1 and 2 wherein a triangular pitch tubular reactor having stainless steel tubes and carbon steel sheets is assembled, the tubes are positioned through appropriate holes in the tube sheet. The end of each tube extends past the surface of the tube sheet as illustrated in FIGURE 2 and is flared slightly. In such tubular assemblies as is known in the art, the tubes are arranged such that the centers comprise the points of an equilateral triangle. The distance between centers of adjacent tubes is defined as the tube pitch, P, while the outer diameter of each tube is the diameter, d. In accordance with the present invention, a sheet metal insert having a configuration such that it rests on the sheet 2 surface while fitting closely between adjacent tubes is placed between 3 adjacent tubes. Other similar inserts are distributed on the surface of the tube sheet and the inserts are welded to each other and to the tube in order to successfully form a tight and uniform surface. The weld is shown as 3.

The inserts are of the same metal as the tubes and thus a good bonding is readily achieved by conventional welding procedures.

The welding of the inserts to each other and to the tubes is continued until the entire tubular reactor assembly is completed. During the welding of the inserts to each other and to the tubes the weld penetrate to the sheet and thus fix the inserts to the sheet in a secure manner.

Figure 3:
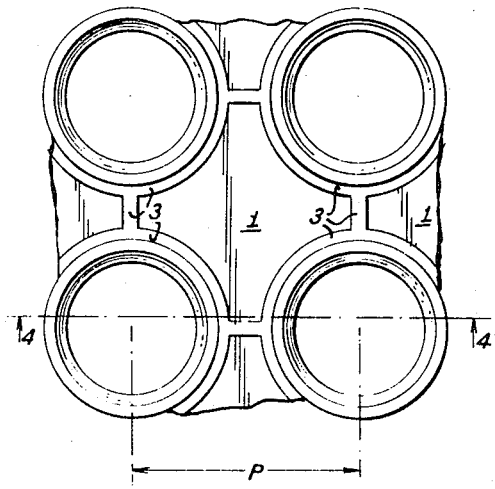
FIGURE 3 shows a plan view of an embodiment of a pattern of a tubular reactor with square pitch assembled by the invention.
Figure 4:
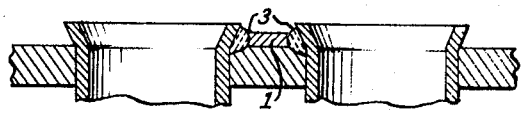
FIGURE 4 is a section view along lines A—A of FIGURE 3.

FIGURES 3 and 4 are generally similar to FIGURES 1 and 2 except that a sheet and tube configuration where the tubes have square pitch is depicted.

The advantages of the present invention are very important insofar as economies of equipment assembly is concerned. The inserts can be readily obtained by conventional sheet metal stamping processes using scrap and can easily be shipped and stored until required for use. The cumbersome previous equipment items are substantially avoided by the provision of these relatively small size inserts. Also, the costs of the purchase of fully clad tube sheets is also avoided. In view of the standardization of tube size and pitches, it is easy to mass produce the geometric inserts designed for a particular installation.

Preferably, the inserts are designed to approximate as closely as is practical the area defined by adjacent tubes as illustrated in the drawings. However, the shapes can vary considerably, the basic requirement being that the inserts can easily be placed between adjacent tubes, and that the inserts occupy a predominance of the surface between tubes.

A preferred insert configuration is alternate arcs of a circle slightly larger than the tube outer diameters joined by straight sections as shown in the drawings FIGURES 1 and 3.

While the invention has been described above in connection with the assembly of a tubular reactor having stainless steel tubes, carbon steel tube sheets and stainless inserts, it will be apparent to those skilled in the art that the invention has general applicability in the construction of sheet and tube apparatus wherein the tubes are of a different metal from the tube sheets. Other examples would be use of particular other alloy steel tubes with carbon steel plates, the use of titanium or other metal tubes with carbon steel sheets, and the like.

The invention is also applicable to tubular assemblies of all conventional tube pitches and sizes ranging from very small tube diameter up through and including tubes having a diameter of 6 inches or more. Likewise it can be seen that the tube sheet itself may be of any size. A great advantage of the invention is that the inserts are essentially independent of the overall reactor size but are dependent on the tube pitch and diameter. This facilitates the preparation and use of these inserts.

It will further be apparent that around the extremities of the tube sheets partial inserts will be employed to finish the uniform surfacing. Such inserts can be conveniently cut and welded in place to complete the vessel assembly.

The following example illustrates the invention.

EXAMPLE

A shell and tube reactor is constructed in accordance with the embodiment of the invention described in FIGURES 1 and 2. The tube sheet is made of 10" thick carbon steel and has a diameter of 186 inches. The sheet thickness is $10^{BWG}$ (.140"). The tubes numbering 19600 (number of tubes) are composed of stainless steel of $22^{BWG}$. The tubes are 25 feet in length. The triangular tube pitch is 1¼ and the outer tube diameter is 1" OD.

The tubes are inserted through appropriate holes in the tube sheet as described in FIGURE 2 and are flared slightly at the end extending slightly past the top or outer sheet surface. Inserts stamped from 10 ga. stainless steel and having a configuration as shown in FIGURES 1 and 2 are inserted between three adjacent tubes except for the tubes nearest the outer sheet edge, which inserts are cut to conform to the outer edge shape. The inserts are welded to the tubes as well as to the next adjacent inserts by conventional welding techniques. Through this procedure there is produced a shell and tube reactor which can successfully be employed in such processing industries as the production of ethylene oxide through the catalytic oxidation of ethylene.

What is claimed is:

1. The method of assembling sheet and tube apparatus wherein the tubes and tube sheet are of different metals which comprises assembling sheet tubes through appropriate holes in the tube sheets, positioning an insert which conforms to the space between adjacent tubes, said insert being of the same metal as the said tubes, and welding said insert and said tubes in such a manner that the welds penetrate to said tube sheet.

2. The method of assembling a multi-tube tubular reactor having triangular pitch wherein the tubes and tube sheet are of different metals which comprises positioning an insert between three adjacent tubes, said insert being of the same metal as the said tubes and said insert conforming to the space between said tubes, and welding said insert to said tubes in such a manner that the welds penetrate to said tube sheet.

3. The method of assembling a multi-tube tubular reactor having a square pitch wherein the tubes and tube sheet are of different metals which comprises positioning an insert between three adjacent tubes, said insert being of the same metal as the said tubes and said insert conforming to the space between said tubes, and welding said insert to said tubes in such a manner that the welds penetrate to said tube sheets.

References Cited

UNITED STATES PATENTS

| 1,753,677 | 4/1930 | Andersen | 29—157.4 |
| 2,209,290 | 7/1940 | Watts | 29—497 X |
| 2,785,459 | 3/1957 | Carpenter | 29—497 X |
| 2,914,346 | 11/1959 | Ryder | 29—497 X |
| 3,045,340 | 7/1962 | Kolling | 29—471.1 |
| 3,052,452 | 9/1962 | Taga. | |
| 3,216,749 | 11/1965 | Summerfield | 29—471.1 X |

JOHN F. CAMPBELL, Primary Examiner

J. L. CLINE, Assistant Examiner